United States Patent
Rotz et al.

(10) Patent No.: US 9,631,094 B2
(45) Date of Patent: Apr. 25, 2017

(54) BITUMEN COMPOSITIONS AND METHODS OF MAKING

(71) Applicant: Honeywell International Inc., Morristown, NJ (US)

(72) Inventors: Steven L. Rotz, Randolph, NJ (US); Scott Hacker, River Edge, NJ (US); Yonghong Ruan, Wayne, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 206 days.

(21) Appl. No.: 14/019,331

(22) Filed: Sep. 5, 2013

(65) Prior Publication Data
US 2014/0069297 A1    Mar. 13, 2014

Related U.S. Application Data

(60) Provisional application No. 61/700,248, filed on Sep. 12, 2012.

(51) Int. Cl.
*C08L 95/00* (2006.01)
*C09D 195/00* (2006.01)

(52) U.S. Cl.
CPC ............ *C08L 95/00* (2013.01); *C09D 195/00* (2013.01); *C08L 2555/40* (2013.01); *C08L 2555/86* (2013.01)

(58) Field of Classification Search
CPC .. C08L 95/00; C08L 2225/00; C08L 2225/10; C08L 2225/20; C08L 2225/30; C08L 2225/32; C08L 2225/34; C09D 195/00; C10C 3/00; C10C 3/02; Y10S 106/07
See application file for complete search history.

(56) References Cited

U.S. PATENT DOCUMENTS

| | | | |
|---|---|---|---|
| 4,242,143 A | 12/1980 | Hagenbach et al. | |
| 4,278,724 A | 7/1981 | Desgouilles | |
| 4,282,127 A | 8/1981 | Desgouilles | |
| 4,659,759 A * | 4/1987 | Jevanoff et al. | 524/68 |
| 4,707,413 A | 11/1987 | Kehr et al. | |
| 4,978,698 A | 12/1990 | Woodhams | |

(Continued)

FOREIGN PATENT DOCUMENTS

| KR | 100275251 B1 | 12/2000 |
|---|---|---|
| WO | WO2004/083554 | 9/2004 |

OTHER PUBLICATIONS

American Society for Testing and Materials, "Symposium on Polymer Modified Asphalt Binders, Dec. 4, 1990", ASTM Special Technical Publication, No. 1108, Conference proceedings published May 1992.

(Continued)

*Primary Examiner* — Kaj K Olsen
*Assistant Examiner* — Alexandra M Moore
(74) *Attorney, Agent, or Firm* — Lorenz & Kopf, LLP

(57) ABSTRACT

A non-blown roofing grade bitumen composition comprising bitumen feedstock, polyolefin having a molecular weight of from about 800 to about 50,000 g/mol, and optionally one or more additives, wherein the softening point of the composition is above 70° C. as determined according to method ASTM D36 and the penetration of the composition is at least about 12 dmm at 25° C. as determined according to method ASTM D5. A method of making the same.

19 Claims, 4 Drawing Sheets

(56) References Cited

U.S. PATENT DOCUMENTS

| | | | |
|---|---|---|---|
| 5,024,886 A | 6/1991 | Geisen et al. | |
| 5,366,779 A | 11/1994 | Thompson | |
| 5,702,796 A | 12/1997 | Thompson | |
| 5,871,034 A | 2/1999 | Sumner | |
| 6,100,317 A | 8/2000 | Liang et al. | |
| 6,284,820 B1 * | 9/2001 | Braga | C08L 95/00 524/70 |
| 6,384,112 B1 | 5/2002 | Boussad | |
| 7,317,045 B2 | 1/2008 | Zanchetta et al. | |
| 7,857,904 B2 | 12/2010 | Trumbore et al. | |
| 7,951,239 B2 | 5/2011 | Trumbore et al. | |
| 7,951,240 B2 | 5/2011 | Trumbore et al. | |
| 2005/0145136 A1 * | 7/2005 | Butler et al. | 106/279 |
| 2007/0054988 A1 | 3/2007 | Zanchetta et al. | |
| 2008/0255277 A1 | 10/2008 | Bobee et al. | |
| 2009/0000514 A1 | 1/2009 | Trumbore et al. | |
| 2009/0133604 A1 * | 5/2009 | Fischer et al. | 106/284.02 |
| 2010/0119820 A1 | 5/2010 | Ultsch | |
| 2011/0197785 A1 | 8/2011 | Trumbore et al. | |
| 2012/0225979 A1 | 9/2012 | Naidoo et al. | |
| 2012/0252939 A1 | 10/2012 | Hacker et al. | |

OTHER PUBLICATIONS

American Society for Testing and Materials, "Standard Test Method for Penetration of Bituminous Materials", ASTM D5, Jul. 2006, 4 pages.

American Society for Testing and Materials, "Standard Test Method for Viscosity Determination of Asphalt at Elevated Temperatures Using a Rotational Viscometer", ASTM D4402, Dec. 2006, 4 pages.

American Society for Testing and Materials, "Standard Test Method for Softening Point of Bitumen (Ring-and-Ball Apparatus)", ASTM D36/D36M, Jan. 2010, 4 pages.

American Society for Testing and Materials, "Standard Test Method for Asphalt Shingles Made from Glass Felt and Surfaced with Mineral Granules", ASTM D3462/D3462M, Jul. 2010, 5 pages.

Choquet et al., "The Determination of SBS, EVA, and APP Polymers in Modified Bitumens", Polymer Modified Asphalt Binders, ASTM STP 1108, pp. 35-49, May 1992.

Drozdova et al., "Modification of Bitumen Properties using Polypropylene and Polyethylene Industrial Wastes", Chemistry and Technology of Fuels and Oils (1986), No. 7, pp. 14-15. (Russian-language publication, 4 pages translation provided).

Edwards et al., "Influence of Commercial Waxes on Bitumen Aging Properties", Energy & Fuels (2005), vol. 19, No. 6, pp. 2519-2525.

Hesp et al., "Stabilization Mechanisms in Polyolefin-Asphalt Emulsions", Polymer Modified Asphalt Binders, ASTM STP 1108, pp. 1-19, May 1992.

Little, "Analysis of the Influence of Low Density Polyethylene Modification (Novophalt) of Asphalt Concrete on Mixture Shear Strength and Creep Deformation Potential", Polymer Modified Asphalt Binders, ASTM STP 1108, pp. 186-202, May 1992.

Newcomb et al., "Laboratory and Field Studies of Polyolefin and Latex Modifers for Asphalt Mixtures", Polymer Modified Asphalt Binders, ASTM STP 1108, pp. 129-150, May 1992.

Pustynnikhov et al., "Feedstocks Modification in the Manufacture of Oxidized Bitumen", Chemistry and Technology of Fuels and Oils (2001), No. 3, pp. 16-17. (4 pages translation of Russian-language publication).

Shuler et al., "Design and Construction of Asphalt Concrete using Polymer Modified Asphalt Binders", Polymer Modified Asphalt Binders, ASTM STP 1108, pp. 97-109, May 1992.

Tayebali et al., "Influence of the Rheological Properties of Modified Asphalt Binders on the Load Deformation Characteristics of the Binder-Aggregate Mixtures", Polymer Modified Asphalt Binders, ASTM STP 1108, pp. 77-96, 110-128, May 1992.

Vajnbender et al., "Tar Specifications for Producing Oxidized Road Bitumen", Chemistry and Technology of Fuels and Oils (2003), No. 4, pp. 45-47. (Russian-language publication, 5 pages translation provided).

World Health Organization, International Agency for Research on Cancer, "Occupational Exposures to Bitumens and Their Emissions", Oct. 18, 2011.

International Search Report mailed Nov. 18, 2013 in International Application No. PCT/US2013/058730.

Dongwei Cao et al., "Evaluation of the Long-term Properties of Sasobit Modified Asphalt", ISSN 1997-1400 Int. J. Pavement Res. Technol. 4(6):384-391, Nov. 1, 2011, pp. 384-391, XP055064418.

Chinese Office Action for Application No. 201380047283.9 dated Dec. 12, 2016.

Zhou Dianming, Extrusion Molding of Plastic Film, Apr. 30, 2012, China Machine Press, 1st Edition, pp. 81-83.

* cited by examiner

BITUMEN COMPOSITIONS AND METHODS OF MAKING

CROSS REFERENCE TO RELATED APPLICATION

The present application claims priority under 35 U.S.C. §119(e) to U.S. Provisional Patent Application No. 61/700,248, filed on Sep. 12, 2012, the disclosure of which is incorporated herein by reference in its entirety.

FIELD OF THE INVENTION

The invention relates to bitumen compositions and methods of making the same.

BACKGROUND OF THE INVENTION

Oxidized bitumen (bitumen is also referred to as asphalt) is used by the roofing industry to make roofing shingles and roofing membranes, among other things. Oxidized bitumen, also called "blown coating," is generally produced by oxidizing a suitable feedstock bitumen, usually straight run bitumen or blends of straight run bitumen, by blowing an oxygen-containing gas (e.g., air, oxygen or an oxygen-inert gas mixture) through the bitumen feedstock at an elevated temperature (usually between 230° C.-290° C. (450° F.-550° F.)) for a certain amount of time (which can be more than 10 hours). Sometimes, this process is conducted in the presence of one or more catalysts. As a result of blowing oxygen, or oxygen-containing gas, through bitumen, the bitumen's properties change. Generally, the blowing process is terminated once the bitumen has obtained the desired penetration, softening point and viscosity.

While the above described process is widely used in the industry, it has significant shortcomings. For example, the process is time consuming and the amount of energy needed for it to work is high because the process must be conducted at a temperature at which the feedstock is fluid enough to allow oxygen-containing gas to bubble through it. More importantly, the bitumen fumes produced by heating the feedstock and blowing an oxygen-containing gas through it are considered a health hazard and are potentially carcinogenic. Examples of compounds in these bitumen fumes include hydrogen sulfide, sulfur oxides ($SO_x$), organosulfur compounds, hydrocarbons, nitrogen oxides ($NO_x$) and carbon monoxides.

Prior to their release into the atmosphere, the bitumen fumes created by the described blowing process are often passed through a water-sealed knockout tank and then subjected to an incineration process to reduce the emission of hazardous substances. However, these emission control measures are expensive and they usually do not prevent the emission of all potentially hazardous substances.

Roofing flux feedstocks require stringent properties to ensure that the resulting blown coating has properties meeting its specifications. Roofing flux feedstocks are in limited supply.

Thus, there remains a need to develop a method that does not rely on the described blowing process but that nevertheless results in bitumen compositions that have the properties of oxidized bitumen. The present invention addresses this need.

SUMMARY OF THE INVENTION

The present invention provides a non-blown roofing grade bitumen composition comprising: a) bitumen feedstock; b) polyolefin having a molecular weight of from about 800 to about 50,000 g/mol; and c) optionally one or more additives, wherein the softening point of the composition is above 70° C. as determined according to method ASTM D36 and the penetration of the composition is at least about 12 dmm at 25° C. as determined according to method ASTM D5.

In certain embodiments of the present invention, the bitumen feedstock is a paving grade bitumen. In other embodiments of the present invention, the polyolefin is selected from the group consisting of polyethylene (PE) homopolymer, low density polyethylene homopolymer (LDPE), linear low density polyethylene homopolymer (LLDPE), high density polyethylene homopolymer (HDPE), oxidized low density polyethylene homopolymer (Ox LDPE), oxidized high density polyethylene homopolymer (Ox HDPE), polypropylene (PP) homopolymer, ethylene-acrylic acid (EAA) co-polymer, ethylene-vinyl acetate (EVA) co-polymer, ethylene maleic anhydride (MAPE) co-polymer, propylene maleic anhydride (MAPP) co-polymer, Fischer-Tropsch wax (FT wax), and mixtures thereof. In other embodiments of the present invention, the additives are selected from the group consisting of plastomers, elastomers, waxes, polyphosphoric acid, flux oil, plasticizers and anti-oxidants. In other embodiments of the present invention, the polyolefin is present at a concentration of from about 0.5 weight % to about 25 weight % of the total weight of the bitumen composition; the asphalt feedstock is present at a concentration of from about 65 weight % to about 99 weight % of the total weight of the bitumen composition; and the one or more additives together are present at a concentration of from about 0.5 weight % to about 10 weight % of the total weight of the bitumen composition.

In certain embodiments of the present invention, the bitumen composition has a softening point at a temperature of from about 80° C. to about 115° C. as determined according to method ASTM D36. In other embodiments of the present invention, the bitumen composition does not comprise styrene/butadiene/styrene triblock copolymer (SBS). In other embodiments of the present invention, the bitumen composition is made by a process of mixing the bitumen feedstock with a polyolefin having a crystallinity of greater than 75%.

The present invention also provides a method of making any of the above bitumen compositions, comprising mixing the polyolefin or mixtures of different low molecular weight polyolefins with the bitumen feedstock at a temperature of from about 75° C. to about 200° C. for a time of about 30 minutes to about 6 hours. In other embodiments of the present invention, the mixing is done by using a low shear mixer at a speed of from about 5 RPM to about 100 RPM.

The present invention provides a non-blown roofing grade bitumen composition comprising: a) bitumen feedstock; b) polyolefin having a molecular weight of from about 800 to about 50,000 g/mol; and c) optionally one or more additives, wherein the softening point of the composition is between 57° C. and 113° C. as determined according to method ASTM D36 and the penetration of the composition is at least about 12 dmm at 25° C. as determined according to method ASTM D5.

In certain embodiments of the present invention, the softening point of the composition is between 57° C. and 66° C. as determined according to method ASTM D36 and the penetration of the composition is from about 18 to about 60 dmm at 25° C. as determined according to method ASTM D5. In other embodiments of the present invention, the softening point of the composition is between 70° C. and 80°

C. as determined according to method ASTM D36 and the penetration of the composition is from about 18 to about 40 dmm at 25° C. as determined according to method ASTM D5. In other embodiments of the present invention, the softening point of the composition is between 85° C. and 96° C. as determined according to method ASTM D36 and the penetration of the composition is from about 15 to about 35 dmm at 25° C. as determined according to method ASTM D5. In even other embodiments of the present invention, the softening point of the composition is between 99° C. and 107° C. as determined according to method ASTM D36 and the penetration of the composition is from about 12 to about 25 dmm at 25° C. as determined according to method ASTM D5.

BRIEF DESCRIPTIONS OF THE DRAWINGS

Specific examples have been chosen for purposes of illustration and description, and are shown in the accompanying drawings, forming a part of the specification. These examples and accompanying drawings should not be construed to limit the scope of the invention in any way.

DETAILED DESCRIPTION OF THE INVENTION

Figure 1:
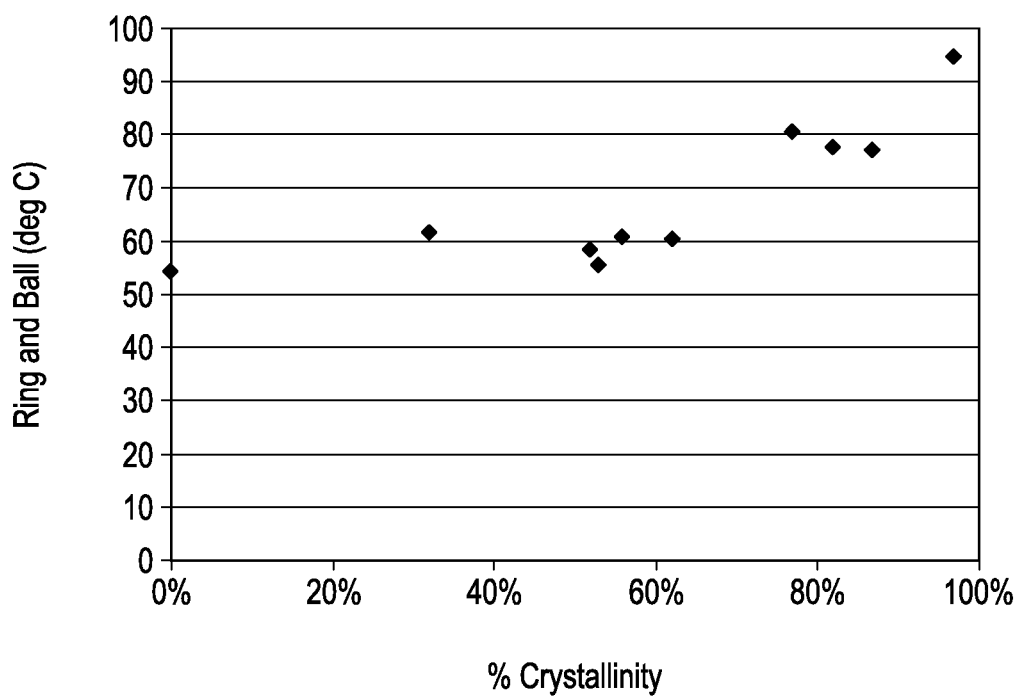
FIG. 1 shows a chart that visualizes the relationship between the softening point data of Table 1 and the corresponding additive crystallinity. Softening point data are plotted as a function of additive crystallinity.

The invention relates to novel bitumen compositions and methods of making the same. It has surprisingly been found that the addition of polyolefin to bitumen feedstock has an effect that is similar to the effect of oxidizing the bitumen feedstock by blowing an oxygen-containing gas through it. This effect can be achieved, in principle, even without the addition of other additives (e.g., styrene/butadiene/styrene triblock copolymer (SBS)). This means that a bitumen's penetration (also referred to as hardness), softening point and viscosity can be optimized and adjusted to industry standards by adding polyolefin to it. Thus, the present invention allows the optimization of bitumen without the shortcomings of oxidizing the bitumen by blowing, which is what is typically done in the art.

The invention provides a non-blown roofing grade bitumen composition comprising: a) bitumen feedstock; b) polyolefin having a molecular weight of from about 800 to about 50,000 g/mol; and c) optionally one or more additives, wherein the softening point of the composition is above 70° C. as determined according to method ASTM D36 and the penetration of the composition is at least about 12 dmm at 25° C. as determined according to method ASTM D5.

Bitumen, also known as asphalt, is the sticky, black and highly viscous liquid or semi-solid present in most crude petroleums and in some other natural deposits. The terms asphalt and bitumen are often used interchangeably to mean both natural and manufactured forms of the substance, both of which are within the scope of the present invention. The production of industry-grade bitumen is generally known in the art and therefore not described herein in any detail.

In the present invention, the bitumen feedstock may be made from any suitable type of bitumen. This includes paving-grade bitumens or a mixture of different paving-grade bitumens. Paving-grade bitumens are typically harder (i.e., have lower penetration) and have a higher softening point and viscosity than those bitumens typically used as feedstock for the oxygen blowing process (e.g., roofing flux feedstock). Paving grade bitumens may be mixed with hard bitumens, pitch, low PEN bitumen and roofing fluxes.

Non-exclusive examples of paving-grade bitumens within the scope of the present invention include paving-grade bitumens having any one of the following performance grades: PG 46-34, PG 52-34, PG 52-28, PG 64-22, PG 64-16, PG 64-10, PG 67-22, PG 70-28, PG 70-22, PG 70-16, PG 70-10, PG 76-28, PG 76-22, PG 76-16 and PG 76-10. Additionally, non-exclusive examples of paving-grade bitumens within the scope of the present invention include paving-grade bitumens having any one of the following penetration grades: 50/70, 60/90, 80/100, 80/120, and 120/150.

In the present invention, the bitumen feedstock may also be made from any suitable type of roofing-grade bitumen, such as, but not limited to, roofing-grade bitumen having any one of the following hardness grades: 100/150 dmm pen, 150/200 dmm pen, 200/300 dmm pen, and 300+ dmm pen.

All of the bitumens disclosed herein, as well as their manufacture, commercial availability and use, are generally known in the art and thus not described herein in detail.

In a preferred embodiment of the present invention, the bitumen feedstock is a paving-grade bitumen.

In certain embodiments of the present invention, the bitumen feedstock is present at a concentration of from about 65 weight % to about 99 weight % of the total weight of the bitumen composition of the present invention. In other embodiments of the present invention, the bitumen feedstock is present at a concentration of from about 65 weight % to about 75 weight %, from about 75 weight % to about 85 weight %, and from about 85 weight % to about 99 weight % of the total weight of the bitumen composition. In a preferred embodiment of the present invention, the bitumen feedstock is present at a concentration of about 97 weight % of the total weight of the bitumen composition.

The polyolefin of the present invention has a molecular weight (weight average molecular weight, Mw) of from about 800 to about 50,000 g/mol. In certain embodiments of the present invention, the polyolefin has a molecular weight of from about 1000 to about 5000 g/mol, from about 5000 to about 10,000 g/mol, from about 10,000 to about 20,000 g/mol, from about 20,000 to about 30,000 g/mol, from about 30,000 to about 40,000 g/mol, and from about 40,000 to about 50,000 g/mol. In one embodiment, the polyolefin has a molecular weight of from about 2000 to about 15,000 g/mol. In another embodiment, the polyolefin has a molecular weight of from about 4000 to about 20,000 g/mol. The molecular weight of the polyolefin of the present invention is determined by gel permeation chromatography (GPC), which is a technique generally known in the art. For the purpose of GPC, the sample to be measured is dissolved in 1,2,4-trichlorobenzene at 140° C. at a concentration of 2.0 mg/ml. The solution (200 uL) is injected into the GPC containing two PLgel 5 µm Mixed-D (300×7.5 mm) columns held at 140° C. with a flow rate of 1.0 mL/minute. The instrument is equipped with two detectors (refractive index and viscosity detector). The molecular weight (weight average molecular weight, Mw) is determined using a calibration curve generated from a set of linear polyethylene narrow Mw standards.

In certain embodiments of the present invention, the polyolefin used to prepare the bitumen composition of the present invention is crystalline. In other embodiments of the present invention, the polyolefin used to prepare the bitumen composition of the present invention is semi-crystalline.

The certain embodiments of the present invention, the polyolefin used to prepare the bitumen composition of the present invention has a crystallinity of greater than 50%. In other embodiments of the present invention, the polyolefin used to prepare the bitumen composition of the present invention has a crystallinity of greater than 75%. In other embodiments of the present invention, the polyolefin used to prepare the bitumen composition of the present invention has a crystallinity of from about 50 to about 60%, from about 60% to about 70%, from about 70% to about 80%, from about 80% to about 90%, and, in a preferred embodiment, from about 90% to about 100%. The crystallinity of said polyolefin is determined by Differential Scanning calorimetry (DSC), which is a technique generally known in the art. The DSC is run in a heat, cool, re-heat cycle at 10° C./minute heating and cooling rates. The sample is initially cooled to −50° C. then heated to 150° C., cooled back down to −50° C. and reheated to 150° C. The percent crystallinity is determined by dividing the enthalpy of fusion determined from the reheat cycle by 290 j/gm for polyethylene (co-) polymers and 190 J/gm for polypropylene polymers.

A particularly preferred polyolefin has a Mw of from about 2,000 to about 5,000 and a crystallinity of from about 90% to about 100%.

In certain embodiments of the present invention, the polyolefin of the present invention is selected from the group consisting of polyethylene (PE) homopolymer, low density polyethylene homopolymer (LDPE), linear low density polyethylene polymer (LLDPE), high density polyethylene homopolymer (HDPE), oxidized low density polyethylene homopolymer (Ox LDPE), oxidized high density polyethylene homopolymer (Ox HDPE), polypropylene (PP) homopolymer, ethylene-acrylic acid (EAA) co-polymer, ethylene-vinyl acetate (EVA) co-polymer, ethylene maleic anhydride (MAPE) co-polymer, propylene maleic anhydride (MAPP) co-polymer, Fischer-Tropsch wax (FT wax), and mixtures thereof.

All of the polyolefins disclosed herein, as well as their manufacture, commercial availability and use, are generally known in the art and thus not described herein in detail.

In some embodiments of the present invention, the polyolefin is present at a concentration of from about 0.5 weight % to about 25 weight % of the total weight of the bitumen composition of the present invention. In other embodiments of the present invention, the polyolefin is present at a concentration of from about 0.5 weight % to about 5 weight %, from about 5 weight % to about 10 weight %, from about 10 weight % to about 15 weight %, from about 15 weight % to about 20 weight %, and from about 20 weight % to about 25 weight % of the total weight of the bitumen composition. In a preferred embodiment of the present invention, the polyolefin is present at a concentration of about 3 weight % of the total weight of the bitumen composition.

In certain embodiments of the present invention, the bitumen composition of the present invention has a softening point at a temperature from about 80° C. to about 115° C. as determined according to method ASTM D36. In other embodiments of the present invention, the bitumen composition of the present invention has a softening point at a temperature from about 80° C. to about 90° C., from about 90° C. to about 100° C., and from about 100° C. to about 115° C., as determined according to method ASTM D36.

In certain embodiments of the present invention, the bitumen composition comprises one or more additives. The use of such additives is well known to those skilled in the art. Such additives may be used to improve certain properties of the bitumen product (e.g., its penetration (i.e., hardness), viscosity, and softening point). Non-exclusive examples of such additives within the scope of the present invention include plastomers, elastomers, waxes, polyphosphoric acids, flux oils, plasticizers, anti-oxidants, and combinations thereof, as well as other conventional additives known to the art, as, for example, recycled ground tire rubber, and anti-strip additives, non-limiting examples of which are hydrated lime and amines. In other embodiments of the present invention, the bitumen composition comprises crumb rubber or polyoctenamer, or both, as additives.

In certain embodiments of the present invention, the one or more additives together are present at a concentration of from about 0.5 weight % to about 10 weight % of the total weight of the bitumen composition. In other embodiments of the present invention, the one or more additives together are present at a concentration of from about 0.5 weight % to about 1.0 weight %, from about 1.0 weight % to about 5.0 weight %, and from about 5.0 weight % to about 10 weight % of the total weight of the bitumen composition.

Elastomers may be selected from the group consisting of natural rubber and synthetic polymerized rubber. Other non-exclusive examples of suitable elastomers within the scope of the present invention include butyl, polybutadiene, polyisoprene and polyisobutene rubber; styrene/butadiene copolymer such as styrene/butadiene/styrene triblock copolymer (SBS); styrene/ethylene-butylene/styrene triblock copolymer (SEBS); poly(styrene-isoprene-styrene) (SIS); ethylene-methacrylate (EMA); ethylene-propylene diene monomer (EPDM); ethylene-vinyl-acetate (EVA); and ethylene glycidyl acrylate terpolymer (EGA).

The wax may be a functionalized or synthetic wax or a naturally occurring wax. The wax may be oxidized or non-oxidized. Non-exclusive examples of synthetic waxes within the scope of the present invention include ethylene bis-stearamide wax (EBS), Fischer-Tropsch wax (FT), oxidized Fischer-Tropsch wax (FTO), polyolefin waxes such as polyethylene wax (PE), oxidized polyethylene wax (OxPE), polypropylene wax, polypropylene/polyethylene wax, alcohol wax, silicone wax, petroleum waxes such as microcrystalline wax or paraffin, and other synthetic waxes. Non-exclusive examples of functionalized waxes within the scope of the present invention include amine waxes, amide waxes, ester waxes, carboxylic acid waxes, and microcrystalline waxes. Naturally occurring wax may be derived from a plant, from an animal, or from a mineral, or from other sources known in the art. Non-exclusive examples of natural waxes within the scope of the present invention include plant waxes such as candelilla wax, carnauba wax, rice wax, Japan wax and jojoba oil; animal waxes such as beeswax, lanolin and whale wax; and mineral waxes such as montan wax, ozokerite and ceresin. Any mixtures of the aforesaid waxes are also within the scope of the present invention. For example, the wax may include a blend of a Fischer-Tropsch (FT) wax and a polyethylene wax.

Phosphoric acid may be used in conventional amounts to raise the product's softening point. The phosphoric acid may be provided in any suitable form, including a mixture of different forms of phosphoric acid. For example, some different forms of phosphoric acid within the scope of the present invention include phosphoric acid, polyphosphoric acid, superphosphoric acid, pyrophosphoric acid and triphosphoric acid.

Plasticizers may be used in conventional amounts to increase the plasticity or fluidity of a material. Non-exclusive examples of plasticizers within the scope of the present invention include hydrocarbon oils (e.g., paraffin, aromatic and naphthenic oils), long chain alkyl diesters (e.g., phthalic acid esters, such as dioctyl phthalate, and adipic acid esters, such as dioctyl adipate), sebacic acid esters, glycol, fatty acid, phosphoric and stearic esters, epoxy plasticizers (e.g., epoxidized soybean oil), polyether and polyester plasticizers, alkyl monoesters (e.g., butyl oleate), long chain partial ether esters (e.g., butyl cellosolve oleate), and other plasticizers known in the art.

Anti-oxidants may be used in conventional amounts to prevent the oxidative degradation of polymers that causes a loss of strength and flexibility in these materials. Such anti-oxidants are generally known in the art and hence not described herein in detail.

All of the additives disclosed herein, as well as their manufacture, commercial availability and use, are generally known in the art and thus not described herein in detail.

In other embodiments of the present invention, the bitumen composition does not comprise one or more additives. In certain embodiments of the present invention, the bitumen composition does not comprise any butadiene/styrene copolymer. In other embodiments of the present invention, the bitumen composition does not comprise a styrene/butadiene/styrene triblock copolymer (SBS).

The present invention also provides a method of making the bitumen compositions described herein by mixing polyolefin or mixtures of polyolefins having different molecular weights and crystallinity, and optionally the one or more additives, with the bitumen feedstock using a suitable temperature and agitation and under overall conditions generally known in the art. In certain embodiments of the present invention, the mixing is performed at a temperature of from about 75° C. to about 200° C. for a time of about 30 minutes to about 6 hours. In other embodiments of the present invention, the mixing is done using a low shear mixer at a speed of from about 5 RPM to about 100 RPM.

The bitumen composition according to the present invention is suitable for use as a coating asphalt to make asphalt roofing shingles. In certain embodiments of the present invention, the bitumen composition meets the standards defined by method ASTM D3462. Also within the scope of the present invention are roofing shingles made from the bitumen composition described herein, and methods of making such roofing shingles.

The softening point (SP) of the bitumen composition of the present invention is measured according to method ASTM D36; the penetration (PEN) (i.e., hardness) is measured according to method ASTM D5, performed at 25° C.; and the melt viscosity is measured according to method ASTM D4402, using a rotational viscometer.

Also within the purview of the present invention are non-blown roofing grade bitumens having the following penetration and softening point ranges, respectively: 25-35 and 70-80; 20-30 and 80-90; 20-30 and 90-100; 30-40 and 100-110; and 10-20 and 110-120. Penetration in this case is measured via EN 1426 and SP in this case is measure via 1427.

The following examples further illustrate the present invention, but should not be construed to limit the scope of the invention in any way.

EXAMPLES

As shown in Tables 1 to 4 below, different crystalline and semi-crystalline polyolefins are mixed with bitumen feedstock (base asphalt) in the indicated weight % of the total weight of the bitumen composition. The mixing is performed at a temperature of from about 148° C. to about 160° C. (300 to 320° F.) using a (non-commercial size) low shear mixer for about 1 to 2 hours at a speed of about 100 RPM to about 1000 RPM to obtain bitumen compositions of the present invention. All of the polyolefins listed in Tables 1 and 2 are commercially available, e.g., from Honeywell International, NJ, USA. The only exception to this is the listed FT wax, which is commercially available from, e.g., Sasol Ltd.

Figure 2:
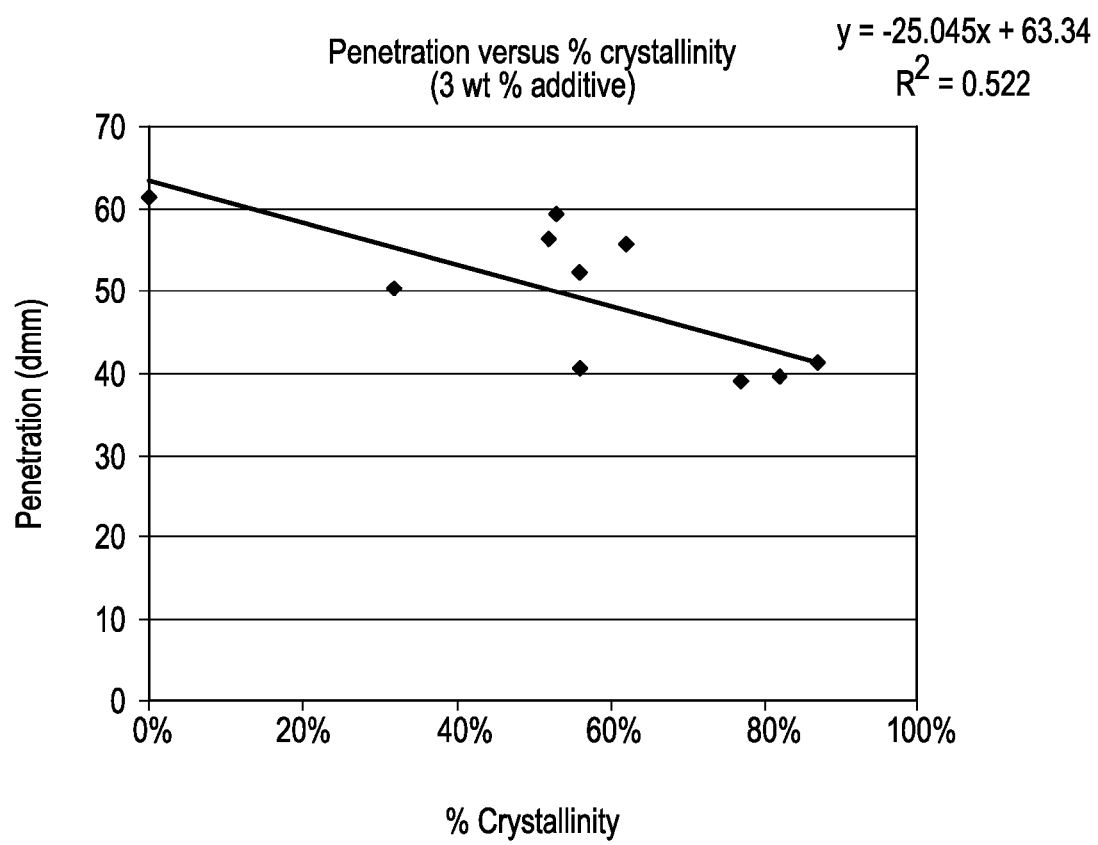
FIG. 2 shows a chart that visualizes the relationship between the penetration data of Table 1 and the corresponding additive crystallinity. Penetration point data are plotted as a function of additive crystallinity.
Figure 3:
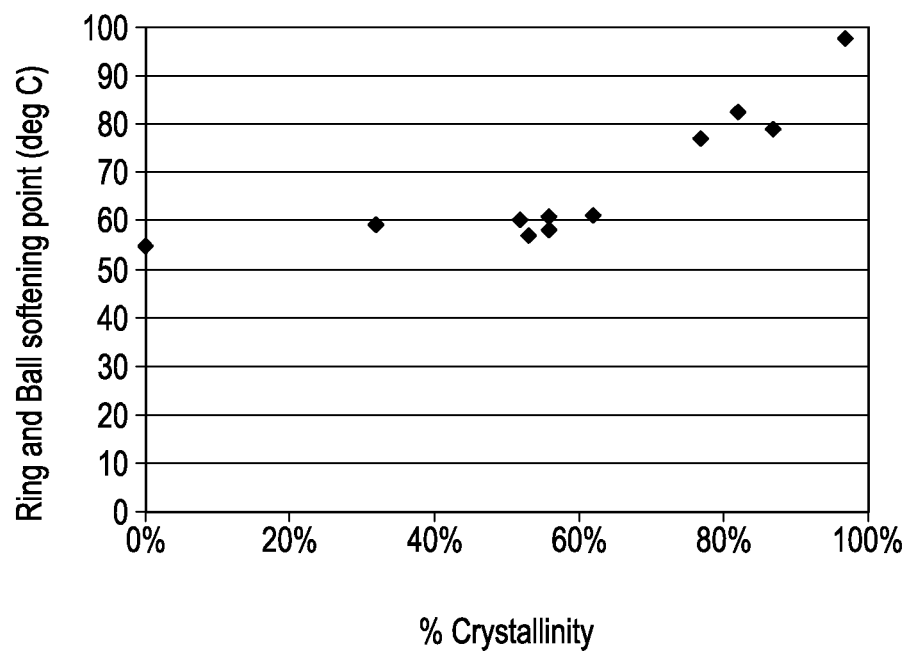
FIG. 3 shows a chart that visualizes the relationship between the softening point data of Table 2 and the corresponding additive crystallinity. Softening point data are plotted as a function of additive crystallinity.
Figure 4:
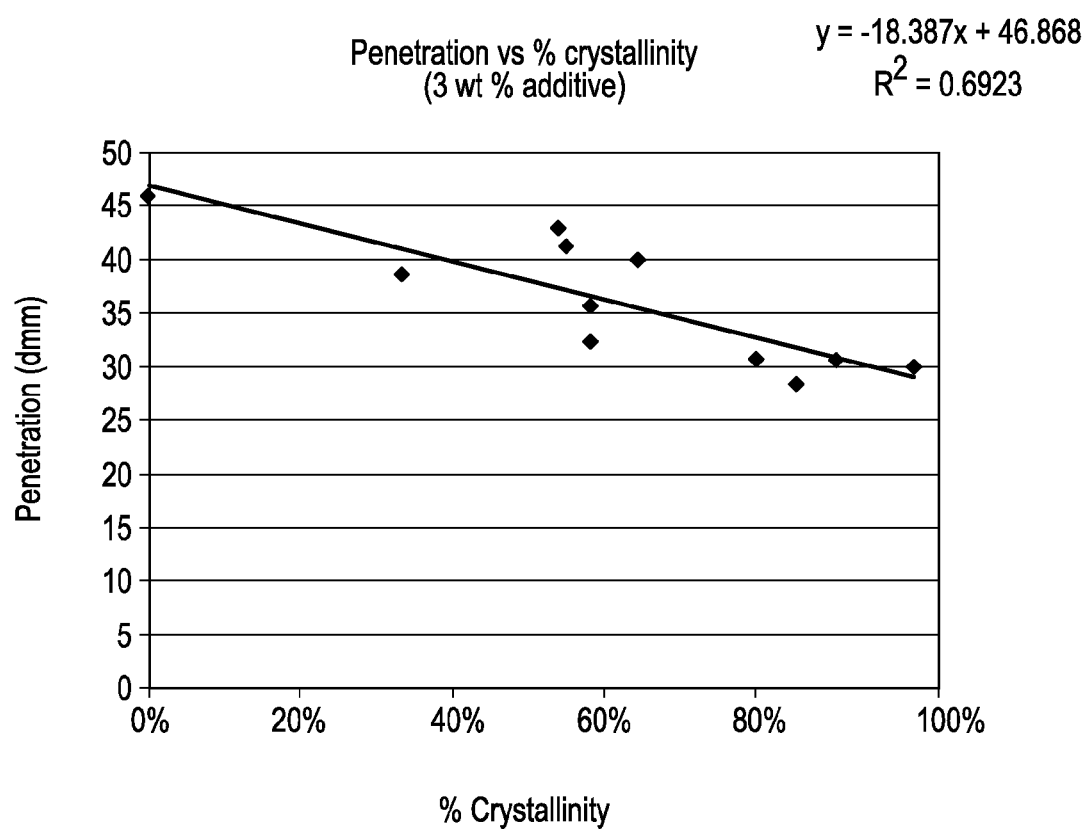
FIG. 4 shows a chart that visualizes the relationship between the penetration data of Table 2 and the corresponding additive crystallinity. Penetration point data are plotted as a function of additive crystallinity.

The penetration (or hardness) of the bitumen compositions of the present invention was measured according to method ASTM D5, performed at 25° C., and the softening point (SP) of the bitumen composition of the present invention was measured according to method ASTM D36. The melt viscosity was measured according to method ASTM D4402, using a rotational viscometer. These measurements showed that the penetration and the softening point of the bitumen compositions of the present invention are lower and higher, respectively, by comparison to the penetration and softening point of the untreated bitumen feedstock (see Tables 1 to 4 below), and similar to the penetration (or hardness) and the softening point that the skilled artisan would expect from oxidized bitumen compositions. These measurements also showed that this effect can be increased by using polyolefins having a particularly high crystallinity and/or by using higher relative amounts of such polyolefins. FIGS. 1 and 2 show charts that visualize the relationship between the softening point data and the penetration data of Table 1, respectively, and the corresponding additive crystallinity. FIGS. 3 and 4 show charts that visualize the relationship between the softening point data and the penetration data of Table 2, respectively, and the corresponding additive crystallinity.

TABLE 1

| Composition | | | | | | | | | | | |
|---|---|---|---|---|---|---|---|---|---|---|---|
| base asphalt 1 (PG 64-16) | 100% | 97% | 97% | 97% | 97% | 97% | 97% | 97% | 97% | 97% | 97% |
| additive (by weight) | 0 | 3% | 3% | 3% | 3% | 3% | 3% | 3% | 3% | 3% | 3% |
| Total | 100% | 100% | 100% | 100% | 100% | 100% | 100% | 100% | 100% | 100% | 100% |
| Honeywell Titan ™ grade | NA | 8903 | 8594 | 8822 | 7457 | A-CX 407 | 7437 | A-CX 1616 | 8932 | 1500 GRS | Honeywell Titan ™ 8570 |
| additive chemistry | NA | Ox HDPE | PE homo polymer | MAPP | PP homo polymer | Ox LDPE | MAPE | EAA | EVA | FT wax | PE Homopolymer |

TABLE 1-continued

| | | | | | | | | | | |
|---|---|---|---|---|---|---|---|---|---|---|
| additive crystallinity | NA | 77% | 82% | 56% | 56% | 62% | 32% | 53% | 52% | 87% | 97% |
| Test Results | | | | | | | | | | |
| Penetration (dmm @ 25° C.) | 61.4 | 38.5 | 39.2 | 40.6 | 52 | 55.6 | 50.2 | 59.2 | 56.2 | 41 | 40 |
| Softening Point (° C.) | 54.1 | 80.6 | 77.7 | 60.8 | 61.2 | 60.6 | 61.7 | 55.5 | 58.2 | 77.1 | 94.5 |

TABLE 2

| Composition | | | | | | | | | | | |
|---|---|---|---|---|---|---|---|---|---|---|---|
| base asphalt 2 (PG 67-22) | 100% | 97% | 97% | 97% | 97% | 97% | 97% | 97% | 97% | 97% | 97% |
| additive (by weight) | 0 | 3% | 3% | 3% | 3% | 3% | 3% | 3% | 3% | 3% | 3% |
| Total | 100% | 100% | 100% | 100% | 100% | 100% | 100% | 100% | 100% | 100% | 100% |
| Honeywell Titan ™ grade | NA | 8903 | 8594 | 8822 | 7457 | A-CX 407 | 7437 | A-CX 1616 | 8932 | 1500 GRS | Honeywell Titan ™ 8570 |
| additive chemistry | NA | Ox HDPE | PE homo polymer | MAPP | PP homo polymer | Ox LDPE | MAPE | EAA | EVA | FT wax | PE homo-polymer |
| additive crystallinity | NA | 77% | 82% | 56% | 56% | 62% | 32% | 53% | 52% | 87% | 97% |
| Test Results | | | | | | | | | | | |
| Penetration (dmm @ 25° C.) | 45.7 | 30.6 | 28.4 | 32.2 | 35.6 | 40.0 | 38.6 | 41.2 | 42.8 | 30.4 | 29.8 |
| Softening Point (° C.) | 54.7 | 76.6 | 82.3 | 60.9 | 57.9 | 61.0 | 59.1 | 56.8 | 60.1 | 78.3 | 97.2 |
| Viscosity (@ 165° C., cPs) | 161 | 175 | 129 | 253 | 233 | 131 | 162 | 161 | 145 | 123 | 159 |

TABLE 3

| Composition | | |
|---|---|---|
| base asphalt 3 (PG 64-22) | 100% | 96.5% |
| additive (by weight) | | 3.5% |
| Total (%) | 100% | 100% |
| Test Results | | |
| Honeywell Titan ™ grade | NA | 8903 |
| additive chemistry | NA | Ox HDPE |
| Penetration (dmm @ 25° C.) | 56.2 | 34 |
| Softening Point (° C.) | 49.9 | 104.4 |

TABLE 4

| Composition | |
|---|---|
| base asphalt 4 (PG 64-22) | 96% |
| additive (by weight) | 4% |
| Total (%) | 100% |
| Test Results | |
| Honeywell Titan ™ grade | 8903 |
| additive chemistry | Ox HDPE |
| Penetration (dmm @ 25° C.) | 37.4 |
| Softening Point (° C.) | 107.9 |

What is claimed is:

1. A non-blown roofing grade bitumen composition comprising:
   a) bitumen feedstock; and
   b) non-oxidized polyolefin selected from the group consisting of, ethylene-acrylic acid (EAA) co-polymer, ethylene-vinyl acetate (EVA) co-polymer, ethylene maleic anhydride (MAPE) co-polymer, propylene maleic anhydride (MAPP) co-polymer, Fischer-Tropsch wax (FT wax), and mixtures thereof having a crystallinity of greater than 75% and having a molecular weight of from about 2000 to about 15,000 g/mol; wherein the softening point of the composition is above 70° C. as determined according to method ASTM D36, and wherein the penetration of the composition is at least about 12 dmm at 25° C. as determined according to method ASTM D5.

2. The bitumen composition of claim 1, wherein the bitumen feedstock is a paving grade bitumen.

3. The bitumen composition of claim 2, wherein the polyolefin is Fischer-Tropsch wax (FT wax).

4. The bitumen composition of claim 3, further comprising additives, wherein the additives are selected from the group consisting of plastomers, elastomers, waxes, polyphosphoric acid, flux oil, plasticizers and anti-oxidants.

5. The bitumen composition of claim 4, wherein the polyolefin is present at a concentration of from about 0.5 weight % to about 25 weight % of the total weight of the bitumen composition; wherein the bitumen feedstock is present at a concentration of from about 65 weight % to about 99 weight % of the total weight of the bitumen composition; and wherein the one or more additives together are present at a concentration of from about 0.5 weight % to about 10 weight % of the total weight of the bitumen composition.

6. The bitumen composition of claim 1, having a softening point at a temperature of from about 80° C. to about 115° C. as determined according to method ASTM D36.

7. The bitumen composition of claim 6, not comprising styrene/butadiene/styrene triblock copolymer (SBS).

8. The bitumen composition of claim 1, wherein the polyolefin has a crystallinity of from about 80% to about 90%.

9. A method of making the bitumen composition of claim 1 comprising mixing the polyolefin or mixtures of different low molecular weight polyolefins with the bitumen feedstock at a temperature of from about 75° C. to about 200° C. for a time of about 30 minutes to about 6 hours.

10. The method of claim 9, wherein the mixing is done by using a low shear mixer at a speed of from about 5 RPM to about 100 RPM.

11. The bitumen composition of claim 1 wherein the polyolefin has a crystallinity of from about 90% to about 100%.

12. A non-blown roofing grade bitumen composition comprising:
 a) bitumen feedstock; and
 b) a polyolefin having a crystallinity of greater than 75% and having a molecular weight of from about 800 to about 50,000 g/mol; wherein the softening point of the composition is between 57° C. and 113° C. as determined according to method ASTM D36, and wherein the penetration of the composition is at least about 12 dmm at 25° C. as determined according to method ASTM D5, and wherein the polyolefin is non-oxidized and is selected from the group consisting of ethylene-acrylic acid (EAA) co-polymer, ethylene-vinyl acetate (EVA) co-polymer, ethylene maleic anhydride (MAPE) co-polymer, and propylene maleic anhydride (MAPP) co-polymer.

13. The bitumen composition of claim 12, wherein the softening point of the composition is between 57° C. and 66° C. as determined according to method ASTM D36 and the penetration of the composition is from about 18 to about 60 dmm at 25° C. as determined according to method ASTM D5.

14. The bitumen composition of claim 12, wherein the softening point of the composition is between 70° C. and 80° C. as determined according to method ASTM D36 and the penetration of the composition is from about 18 to about 40 dmm at 25° C. as determined according to method ASTM D5.

15. The bitumen composition of claim 12, wherein the softening point of the composition is between 85° C. and 96° C. as determined according to method ASTM D36 and the penetration of the composition is from about 15 to about 35 dmm at 25° C. as determined according to method ASTM D5.

16. The bitumen composition of claim 12, wherein the softening point of the composition is between 99° C. and 107° C. as determined according to method ASTM D36 and the penetration of the composition is from about 12 to about 25 dmm at 25° C. as determined according to method ASTM D5.

17. The bitumen composition of claim 12 further comprising c) one or more additives, wherein the additives are selected from the group consisting of plastomers, elastomers, waxes, polyphosphoric acid, flux oil, plasticizers and anti-oxidants.

18. The bitumen composition of claim 12 wherein the bitumen composition consists of the bitumen feedstock and the polyolefin.

19. The bitumen composition of claim 12 wherein the polyolefin has a crystallinity of from about 90% to about 100%.

* * * * *